Sept. 1, 1931.     F. J. PIKE     1,821,273
STABILIZER FOR AIRPLANES
Filed July 1, 1929     2 Sheets-Sheet 1

Sept. 1, 1931.  F. J. PIKE  1,821,273
STABILIZER FOR AIRPLANES
Filed July 1, 1929  2 Sheets-Sheet 2
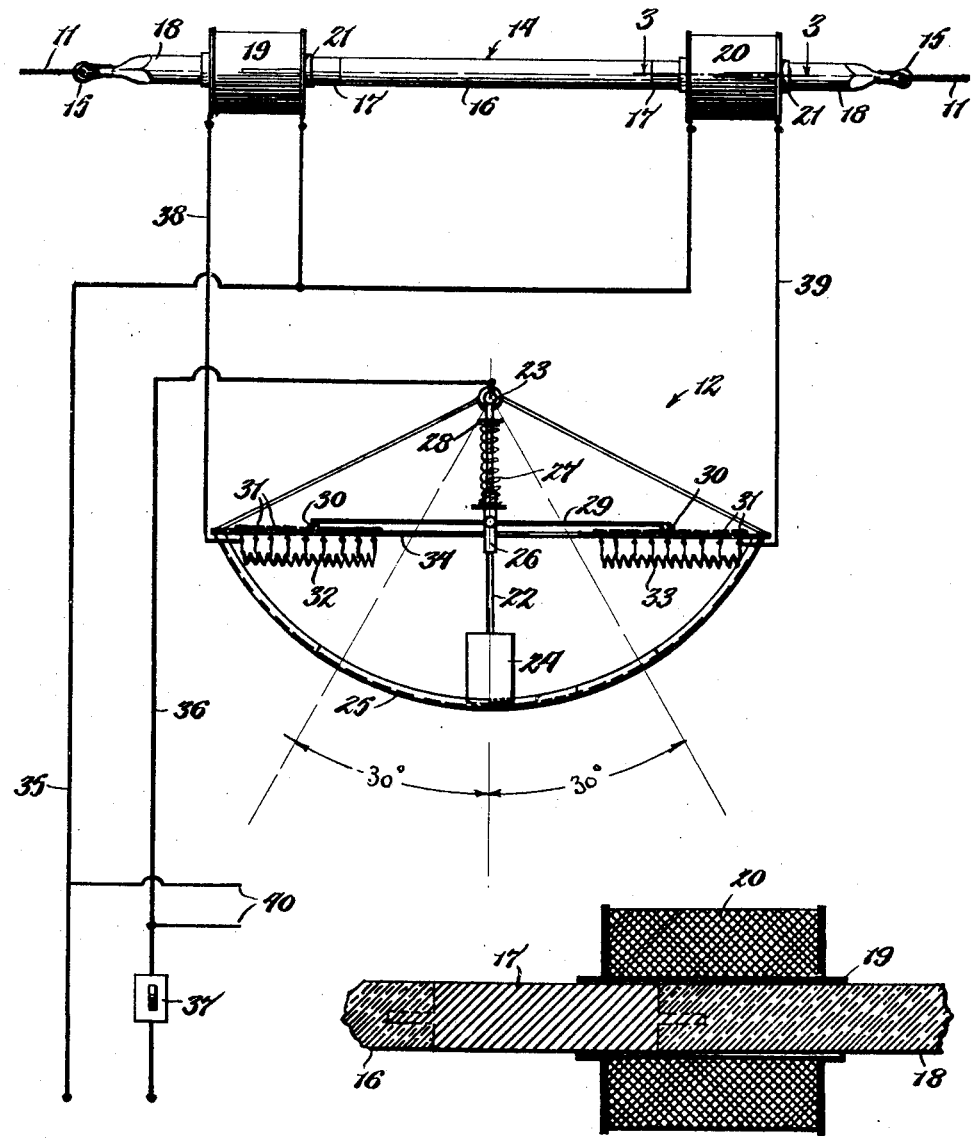

Patented Sept. 1, 1931

1,821,273

UNITED STATES PATENT OFFICE

FREDERICK J. PIKE, OF BUFFALO, NEW YORK

STABILIZER FOR AIRPLANES

Application filed July 1, 1929. Serial No. 375,078.

This invention relates to a stabilizer for airplanes and the like and more particularly to a device which automatically moves the ailerons and elevator of an airplane so as to maintain a horizontal flying position of the airplane without attention on the part of the pilot.

The principal object of this invention is to provide control means which are responsive to the tilting or inclination of an airplane and operate, when the airplane departs from its normal horizontal flying position, to move the ailerons or elevator, as may be required, and bring the plane back to its normal horizontal flying position. By this means, the pilot, having taken off and attained the desired altitude, is relieved of all necessity of operating the airplane controls, except for the actual steering of the plane in a horizontal direction.

A further aim is to provide such a stabilizer which operates entirely through electromagnetic means thereby avoiding the dangers of failure such as are liable to occur with mechanical, pneumatic or hydraulic mechanisms on airplanes.

Another purpose is to provide such a stabilizer which can instantly be rendered operative or inoperative at the pleasure of the driver and when rendered inoperative has no influence on the normal manual controls of the plane.

A still further object is to provide such a stabilizer which operates through the regular manual controls normally used in moving the ailerons and elevator and thereby avoids the necessity of having two separate control systems for these airfoils, and which is so designed that when the stabilizer is intentionally rendered inoperative, or should it fail to operate, the normal controls can be operated in the usual manner.

Other objects are to provide such a stabilizer which is compact and light in weight, which is inexpensive to make and can be readily installed in airplanes now in use and is reliable in its operation and will not get out of order in constant service.

In the accompanying drawings:

Figure 2 is an enlarged diagrammatic view of a stabilizer embodying my invention showing the same connected with the control cable for the ailerons.

Figure 3 is an enlarged fragmentary section taken on line 3—3, Fig. 2.

Similar characters of reference indicate like parts in the several figures of the drawings.

Figure 1:
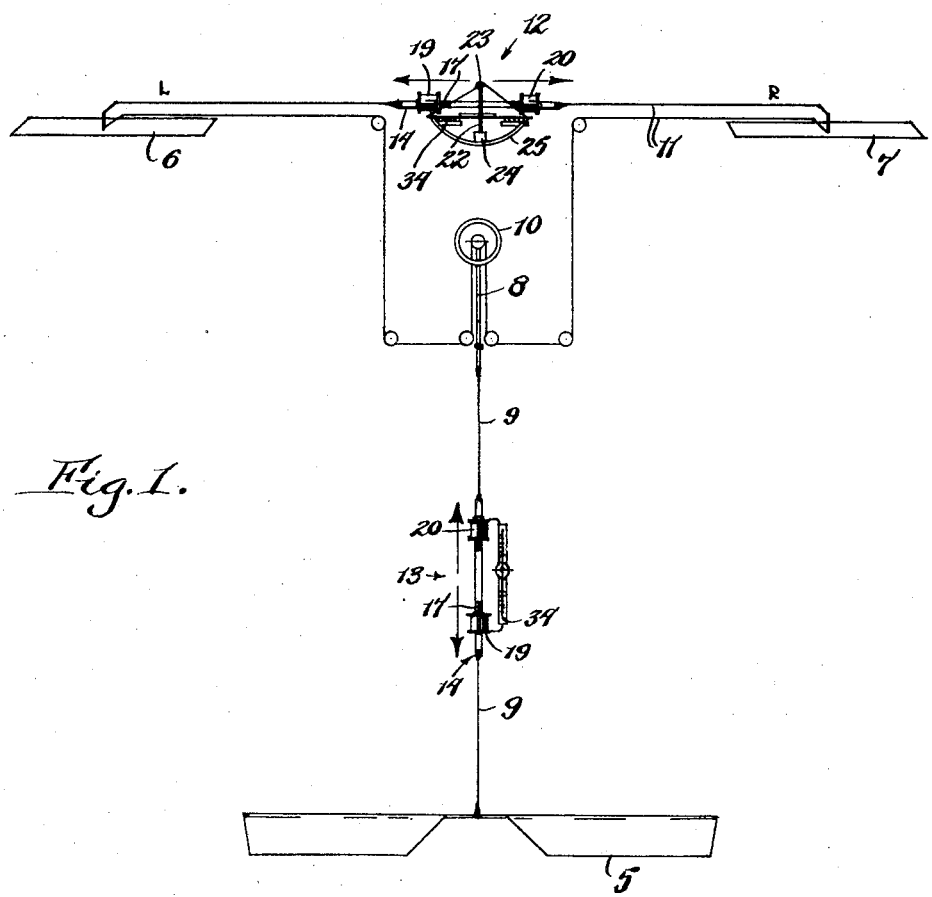
Figure 1 is a diagrammatic view of the ailerons and elevator of an airplane showing the usual operating cables therefor and showing a stabilizer embodying my invention connected to each of these operating cables.

In its general organization this invention comprises a rod which is connected to the normal control cable for the ailerons or elevator of the airplane, electro-magnetic means for moving said rod lengthwise to operate ailerons or elevator, a pendulum or other element which is responsive to the tilting of the airplane from its normal horizontal flying position and a rheostat operated by the pendulum and connected with said electro-magnetic means and operating to shift said rod and move said ailerons or elevator so as to bring the plane back to normal flying position. Separate stabilizers are provided for the ailerons and elevator, the pendulum of the aileron stabilizer swinging transversely of the plane and the pendulum of the elevator swinging longitudinally of the plane.

The elevator 5 is located in the usual manner at the tail of the airplane and the right and left ailerons 6 and 7 at the trailing edge of each wing near the tip thereof are indicated diagrammatically in Fig. 1.

These are pivotally mounted so as to swing about their horizontal axes, the elevator 5 directing the plane in a vertical direction and the right and left ailerons being connected to move in opposite directions so as to cause the plane to incline sidewise or bank in making a turn. Both of these airfoils are controlled from a post or stick 8 in the fuselage, this post being pivotally mounted to move forwardly and rearwardly and being connected by cables 9 with the elevator 5 so that this movement operates the elevator and this post also being provided with a wheel 10 which is connected by cables 11 in such manner that when the wheel 10 is turned, the ailerons are swung in opposite vertical directions to bank the airplane or to bring it to a normal horizontal position. Any form of manual or foot control for the elevator and ailerons can be employed, however, that diagrammatically shown being merely illustrative of one form with which my invention can be used.

During the greater part of the flying time the airplane is held in a normal horizontal flying position, i. e. the airplane is horizontal both fore and aft and also across the wings. With present airplanes, this requires constant attention and manipulation of the aileron and elevator controls on the part of the pilot since the varying winds and other atmospheric conditions tend constantly to throw the airplane out of this normal horizontal flying position and the pilot is required to move the elevator or the ailerons or both to bring the airplane back to this normal flying position.

The maintenance of this normal horizontal position of the airplane is accomplished by means of two devices embodying the present invention, one indicated at 12 being connected to the aileron cable 11 and being responsive to the lateral tilting or tipping of the airplane to move the ailerons 6 and 7 and restore the airplane to a normal lateral horizontal position, and the other indicated at 13 being connected with one of the elevator cables 9 and being responsive to the fore and aft tilting of the airplane to move the elevator and restore the airplane to its normal fore and aft horizontal flying position. By this means the combined action of these two devices serve to maintain the normal horizontal flying position of the airplane both laterally and fore and aft. These devices 12 and 13 are alike in construction and operation and hence a description of one will be deemed to apply to both.

Each of these devices includes a longitudinally movable rod 14 which is provided with eyes 15 or the like at its opposite ends, these eyes being connected to the aileron cables 11 or the elevator cable 9. This rod is made of several sections, the central section 16 being made of a suitable insulating material, the intermediate sections 17 being made of iron or other magnetic material and the end sections 18 being made of an insulating material. These sections are arranged end for end and are joined together in any suitable manner as indicated in Fig. 3.

Around this bar 14 are arranged two solenoids 19 and 20, each of which is arranged adjacent one of the iron sections 17 and preferably to the outside thereof so that when one or the other of the solenoids is energized, the electro-magnetic attraction of the adjacent core or iron section 17 causes the bar 14 to be shifted longitudinally in a corresponding direction. Each of these solenoids preferably includes a tubular core 21 of an insulating material and the wire wound upon the same is preferably made of aluminum for lightness.

The means for energizing these solenoids in response to the tilting of the airplane so as to again right the airplane includes a pendulum 22 which is pivoted at its upper end to any stationary part as indicated at 23 and at its lower end carries a weight 24. This weight preferably swings in an arcuate channel 25 which is fixed to the airplane in any suitable manner and guides the pendulum in its oscillations. On the pendulum 22 is mounted a vertically sliding sleeve 26 which is urged downwardly by a spring 27, this spring being interposed between a fixed collar 28 on the pendulum and a collar on the sleeve 26 and surrounding the pendulum.

To this sleeve is pivoted a horizontal contact arm 29, this arm being pivoted at its center and carrying contacts 30 at its under side and at its opposite ends. These contacts 30 ride over contacts 31 of two rheostats 32 and 33, the contacts being preferably mounted on a fixed slotted bar 34 of insulating material, the pendulum swinging in the slot in this bar. Each of the contacts 31 is connected with the resistance of the rheostats in any suitable manner. The pendulum 22 is designed to swing through an arc of about 60 degrees.

The electrical energy for operating the device is derived from two power lines 35 and 36, one of which contains a switch 37 for rendering the device operative and inoperative. One power line 36 connects with the pendulum 22 and with the movable contacts 30 of the contact arm 29 carried thereby and the other power line 35 connects with one terminal of each of the solenoids 19 and 20. The other terminal of the solenoid 19 is connected by a line 38 with the resistance of the rheostat 32 and the other terminal of the solenoid 20 is connected by a line 39 with the resistance of the rheostat 30. The other device 13 for controlling the elevator is preferably connected to the power lines 35 and 36 by lines 40 so that the switch renders both of the devices 12 and 13 operative and inoperative at the same time.

In taking off, the switch 37 is open and the pilot operates both the elevator and ailerons manually by moving the stick or post back and forth to deflect the elevator as desired and by turning the wheel 10 to move the ailerons as desired. Having climbed to the desired altitude, he closes the switch 37 and thereby places both of the stabilizing devices 12 and 13 in operation.

Assuming that a gust of wind raises the right wing or tilts the plane laterally, the stabilizing device 12 controlling the ailerons is placed in operation, the operation being as follows:

The elevation of the right wing causes the pendulum 22 to swing to the left thereby moving the contact arm 29 to cut resistance out of the rheostat 32 and to cut resistance into the rheostat 33. This causes more current to pass from the power line 36 through pendulum 22, contact arm 29, rheostat 32, wire 38, solenoid 19, and return power wire 35 than through the power line 36, pendulum 22, contact arm 29, rheostat 33, wire 39, solenoid 20 and return power wire 35 and consequently the solenoid 19 is energized to a greater degree than the solenoid 20. Since the solenoid 19 preponderates in power, it will draw its core 17 toward it and consequently move the rod 14 to the left. This movement of the rod 14 to the left raises the right aileron 7 and depresses the left aileron 6 thereby depressing the right wing of the plane and elevating the left wing until the normal horizontal running position is resumed. It is obvious that when the conditions are reversed i. e. the left wing elevated and the right wing depressed that the pendulum swings to the right and a reverse relative energization of the solenoids takes place, resistance being cut out of the rheostat 33 and into the rheostat 32 and the solenoid 20 energized to a greater extent than the solenoid 19 thereby to shift the rod 14 to the right. It is apparent that by controlling the solenoids 19 and 20 through rheostats that a graduated effect is obtained, a slight deviation from the horizontal resulting in a slight movement of the ailerons to return the airplane to a horizontal position and a violent deviation resulting in a correspondingly large movement of the aileron.

The device 13 operates in the same manner as the device 12, the device 13 restoring the airplane to a normal horizontal fore and aft running position. Thus should the nose of the airplane be depressed by a gust of wind, the pendulum 22 swings forward cutting resistance into the rheostat 32 and out of the rheostat 33 thereby energizing the solenoid 20 to a greater extent than the solenoid 19 and shifting the rod 14 forwardly to raise the elevator and depress the nose. If the elevator should be depressed, the pendulum 22 of the device 13 is swung rearwardly and the elevator is depressed to raise the tail of the airplane.

It is therefore apparent that the pilot is relieved of the necessity of paying attention to his aileron and elevator controls when the plane is in flight, but that he can instantly restore the controls to manual operation by throwing the switch 37. The devices are also light in weight, inexpensive to manufacture, compact and are simple in construction and not liable to get out of order. In the event of a failure of the device, however, the controls are automatically restored to manual operation, and since there are no mechanical impedances to the free movement of the control cables 9 or 11, the devices cannot cause the cables to jam or get out of manual control.

I claim as my invention:—

1. A device of the character described for an airplane having at least one horizontal, movable airfoil element for controlling the horizontal position of the airplane while in flight, comprising dual electro-magnetic means the opposing forces of which move said element in opposite directions, a rheostat constantly energizing and controlling the electrical energy through said dual electro-magnetic means, and means responsive to the tilting of said airplane from its normal horizontal flying position to move said rheostat and vary the relative electrical energy delivered to the two parts of said electromagnetic means and restore the normal horizontal flying position of said airplane.

2. A device of the character described for an airplane having at least one horizontal, movable airfoil element for controlling the horizontal position of the airplane while in flight, comprising a pair of solenoids having at least one movable core connected with said element, and means responsive to the tilting of said airplane from its normal, horizontal flying position to deliver a constant supply of electrical energy to each of said solenoids and to vary the relative energy delivered to each of said solenoids and restore the normal horizontal flying position of said airplane.

3. A device of the character described for an airplane having at least one horizontal, movable airfoil element for controlling the horizontal position of the airplane while in flight, comprising a solenoid having a movable core connected with said element, a rheostat controlling the electrical energy through said solenoid, a pendulum having a weight, an arcuate channel bar guiding the end of said pendulum for movement in a straight path, a contact arm carried by said pendulum and engaging the contacts of said rheostat, spring means carried by said pendulum and forcing said arm in engagement with the contacts of said rheostat, and a source of electrical energy connected with said contact arm and said solenoid whereby the movement of said pendulum from its normal position varies the electrical energy actuating said solenoid and restores the normal horizontal flying position of said airplane.

4. A mechanism of the character described for an airplane having ailerons and an elevator, manual means controlling said ailerons and manual means controlling said elevator, comprising a pair of magnetic elements connected with and forming a part of said manual aileron controlling means, means responsive to the lateral tilting of said airplane to constantly energize and to vary the relative electrical energy delivered to said pair of magnetic elements and move said ailerons to restore said airplane to a laterally horizontal flying position, a pair of magnetic elements connected with and forming a part of said manual elevator controlling means and means responsive to the fore and aft tilting of said airplane to constantly energize and to vary the relative electrical energy delivered to said last named pair of magnetic elements and move said ailerons to restore said airplane to a fore and aft horizontal flying position.

5. A mechanism of the character described for an airplane having ailerons and an elevator, manual means controlling said ailerons, and manual means controlling said elevator, said manual means including a longitudinally movable member, comprising a sectional rod connected with and forming a part of each of said longitudinally movable members, two sections of each of said rods being made of a magnetic material, a pair of solenoids surrounding each rod and arranged on opposite sides of said sections of magnetic material, means responsive to the lateral tilting of said airplane to constantly energize said solenoids and to energize one of said solenoids of said aileron rod to a greater degree than the other whereby said aileron rod is shifted by said solenoids to move said ailerons and restore said airplane to a laterally horizontal flying position, and means responsive to the fore and aft tilting of said airplane to constantly energize said solenoids and to energize one of said solenoids of said elevator rod to a greater degree than the other whereby said elevator rod is shifted by said last named solenoid to move said elevator and restore said airplane to a fore and aft horizontal flying position.

6. A mechanism of the character described for an airplane having ailerons, and an elevator, manual means controlling said ailerons, and manual means controlling said elevator, said manual means including a longitudinally movable member, comprising a sectional rod connected with and forming a part of each of said longitudinally movable members, two sections of each of said rods being made of a magnetic material, a pair of solenoids surrounding each rod and arranged on opposite sides of said sections of magnetic material, a pendulum guided for laterally swinging movement relative to said airplane, a pair of rheostats actuated by the movement of said pendulum, means connecting said rheostats and aileron solenoids with a source of electrical energy, said elements being so organized that upon a lateral tilting of said airplane said pendulum swings to cut resistance out of one of said rheostats and into the other and effect a differential in the current passing through said aileron solenoids whereby said aileron bar is moved to actuate said ailerons and restore said airplane to a laterally horizontal flying position, a second pendulum guided for fore and aft swinging movement in said airplane, a second pair of rheostats actuated by the movement of said pendulum, means connecting said second pair of rheostats and said elevator solenoids with a source of electrical energy, said last named elements being so organized that upon a fore and aft tilting movement of said airplane said pendulum swings to cut resistance out of one of said second rheostats and into the other and effect a differential in the current passing through said elevator solenoids whereby said elevator bar is moved to actuate said elevator and restore said airplane to a fore and aft horizontal flying position.

7. A device of the character described for an airplane having at least one horizontal movable airfoil element for controlling the horizontal position of the airplane while in flight, comprising a pair of solenoids having at least one movable core connected with said element, a rheostat having one series of contacts connected with one solenoid and another series connected with the other, a contact member bridging said contacts and in constant contact with the contacts of both series, a source of electrical energy connected with said contact member and pendulum means for oscillating said contact member to vary the relative amounts of electrical energy to each of said solenoids, said pendulum means being responsive to the tilting of the airplane from its normal flying position and operating through said solenoids to move said airfoil element and restore the airplane to its normal flying position.

In testimony whereof I hereby affix my signature.

FREDERICK J. PIKE.